United States Patent
Sasaki et al.

(12) United States Patent (10) Patent No.: US 7,357,212 B2
(45) Date of Patent: Apr. 15, 2008

(54) PEDESTRIAN PROTECTION AIRBAG SYSTEM

(75) Inventors: Sakae Sasaki, Wako (JP); Ken Nakane, Wako (JP); Yutaka Okamoto, Wako (JP); Yuji Kikuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 295 days.

(21) Appl. No.: 11/206,687

(22) Filed: Aug. 18, 2005

(65) Prior Publication Data

US 2006/0042854 A1   Mar. 2, 2006

(30) Foreign Application Priority Data

Aug. 26, 2004   (JP) .............................. 2004-246187

(51) Int. Cl.
    B60R 21/34   (2006.01)
(52) U.S. Cl. ............... 180/274; 296/187.04; 280/730.1
(58) Field of Classification Search ................ 180/274; 280/5.5, 5.506, 5.507, 730.1; 296/187.04; B60R 21/036, B60R 21/034
    See application file for complete search history.

(56) References Cited

U.S. PATENT DOCUMENTS

| 6,182,782 B1 * | 2/2001 | Matsuura et al. ........... 180/274 |
|---|---|---|
| 6,467,563 B1 * | 10/2002 | Ryan et al. .................. 180/274 |
| 6,773,057 B2 * | 8/2004 | Nomura ....................... 296/198 |
| 6,827,170 B2 * | 12/2004 | Hamada et al. ............. 180/274 |
| 6,857,495 B2 * | 2/2005 | Sawa .......................... 180/274 |
| 6,920,954 B2 * | 7/2005 | Hashimoto et al. ......... 180/274 |
| 6,923,286 B2 * | 8/2005 | Sato et al. ................... 180/274 |
| 7,174,985 B2 * | 2/2007 | Sawa et al. .................. 180/274 |

FOREIGN PATENT DOCUMENTS

JP   2003-252140   9/2003

* cited by examiner

*Primary Examiner*—Joe H. Cheng
*Assistant Examiner*—Jacob Meyer
(74) *Attorney, Agent, or Firm*—Rankin, Hill & Clark LLP (57) ABSTRACT

In a pedestrian protection airbag system, an airbag module extending in the lateral direction of a vehicle body is disposed between a rear edge of a hood and a front edge of a cowl top, thereby mounting the airbag module without affecting the intake of air into a vehicle compartment or the positioning of wipers; and the left and right ends of the airbag module are supported by upper parts of left and right front wheel damper housings, whereby the damper housings obtain a high rigidity to reliably bear a reaction force during deployment of an airbag without particularly enhancing the rigidity of the cowl top. Thus, it is possible to rigidly support the airbag module in the pedestrian protection airbag system while minimizing the influence on the shape or structure of the cowl top.

11 Claims, 11 Drawing Sheets

PEDESTRIAN PROTECTION AIRBAG SYSTEM

RELATED APPLICATION DATA

The Japanese priority application No. 2004-246187 upon which the present application is based is hereby incorporated in its entirety herein by reference.

BACKGROUND OF THE INVENTION

1. Field of the Invention

The present invention relates to a pedestrian protection airbag system comprising an airbag and an inflator that generates gas to deploy the airbag along an upper face of a cowl top and a front face of a windshield upon contact with a pedestrian.

2. Description of the Related Art

Japanese Patent Application Laid-open No. 2003-252140 discloses a pedestrian protection airbag system comprising an airbag module which is disposed within a cowl top positioned between a rear edge of a hood and a front edge of a windshield of an automobile; and when the automobile hits a pedestrian, the airbag is deployed from the cowl top so as to protect the pedestrian.

However, in this conventional arrangement, since the airbag module is disposed within the cowl top, the airbag module disadvantageously impedes air being taken into a vehicle compartment through the cowl top and restricts the degree of freedom in a wiper layout or a cowl top shape. Further, since the airbag module receives a downward reaction load when the airbag is deployed, it is necessary to enhance the rigidity of the cowl top which supports the airbag module and the rigidity of a dashboard which is connected to the cowl top, disadvantageously leading to an increase in the vehicle body weight.

SUMMARY OF THE INVENTION

The present invention has been accomplished under the above-mentioned circumstances, and it is an object thereof to rigidly support an airbag module in a pedestrian protection airbag system while minimizing the influence on the shape or structure of a cowl top.

In order to achieve the above-mentioned object, according to a first feature of the invention, there is provided a pedestrian protection airbag system comprising: an airbag module disposed along a front face of a cowl top so as to extend in the lateral direction of a vehicle body, with its left and right ends supported on upper parts of left and right damper housings of left and right front wheels, the airbag module comprising: an airbag; and an inflator that generates gas to deploy the airbag along an upper face of the cowl top and a front face of a windshield upon contact with a pedestrian.

According to a second feature of the present invention, in addition to the first feature, the upper parts of the left and right damper housings are connected to each other by a reinforcing member that functions as a retainer for housing the inflator and the airbag of the airbag module.

According to a third feature of the present invention, in addition to the first feature, the airbag module comprises a cover that opens when the airbag is deployed, the cover being divided into a plurality of lids arranged in the lateral direction of the vehicle body by means of laser-processed breakable brittle portions.

A strut tower bar of an embodiment corresponds to the reinforcing member of the present invention.

With the first feature, since the airbag module, which extends in the lateral direction of the vehicle body, is disposed along the front face of the cowl top, it is possible to mount the airbag module without affecting the intake of air into a vehicle compartment or the positioning of wipers. Further, since the left and right ends of the airbag module are supported by the upper parts of the left and right damper housings of the left and right front wheels, the damper housings obtain a high rigidity to reliably bear the reaction force during deployment of the airbag, without particularly enhancing the rigidity of the cowl top.

With the second feature, since the reinforcing member, which provides a connection between the upper parts of the left and right damper housings, functions as the retainer for housing the inflator and the airbag of the airbag module, it is possible to ensure the rigidity of the vehicle body by means of the reinforcing member while reducing the strength required for the airbag module by making the reinforcing member support the reaction load during deployment of the airbag.

With the third feature, since the cover of the airbag module is divided into the plurality of lids arranged in the lateral direction of the vehicle body by means of the brittle portions, the cover can be opened smoothly by splitting it into the plurality of lids when deploying the airbag. Further, the brittle portions are laser-processed to be inconspicuous, thus improving the appearance.

The above-mentioned object, other objects, characteristics, and advantages of the present invention will become apparent from an explanation of preferred embodiments that will be described in detail below by reference to the attached drawings.

DESCRIPTION OF PREFERRED EMBODIMENTS

Figure 1:
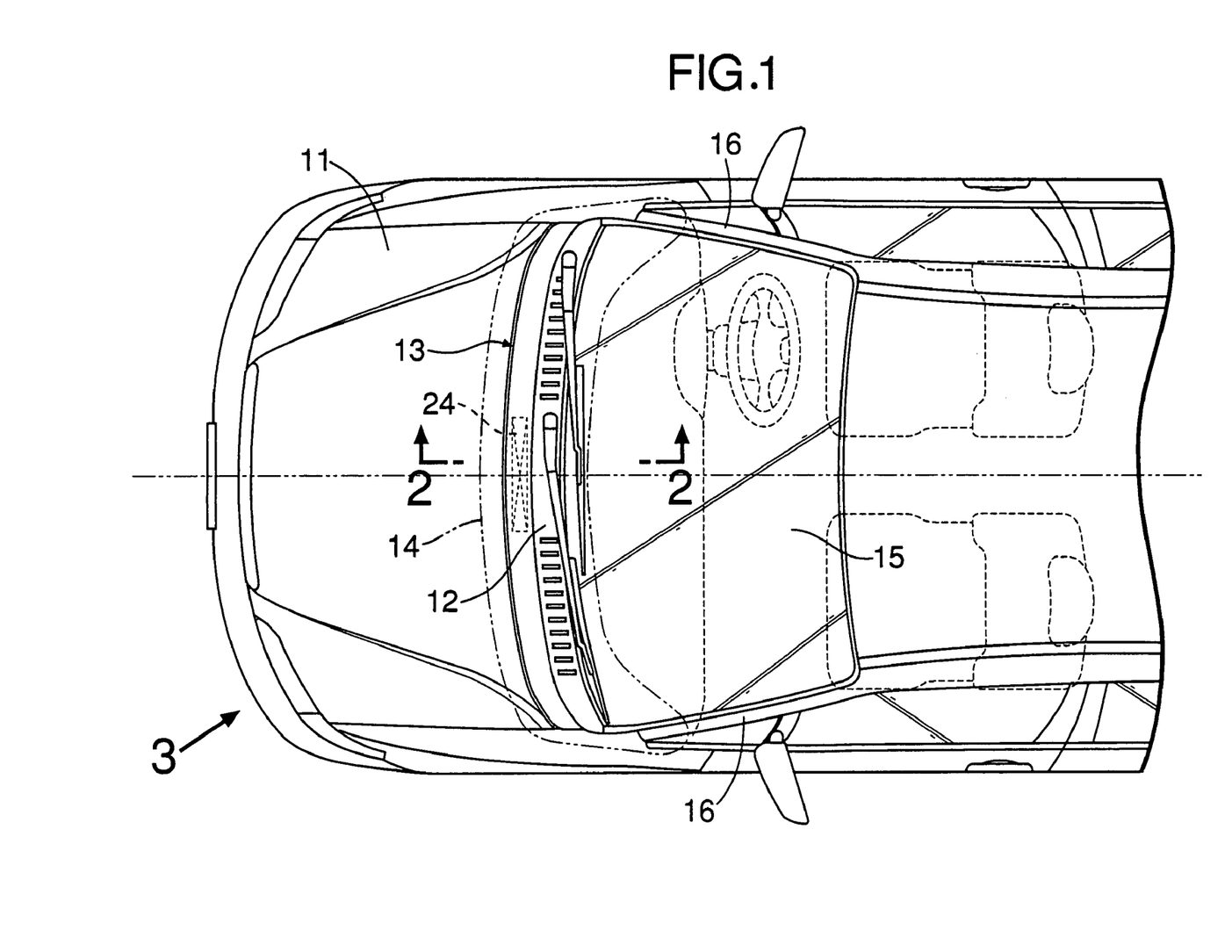
FIG. 1 is a plan view of a front part of a vehicle body of an automobile mounting a pedestrian protection airbag system according to a first embodiment of the present invention.

As shown in FIG. 1, an airbag module 13 extending in the lateral direction of a vehicle body is disposed between a rear edge of a hood 11 and a front edge of a cowl top 12 of an automobile. When a pedestrian is hit by a front part of the vehicle body, an airbag 14 is deployed from the airbag module 13 to a position shown by the chain line so as to cover an upper face of the cowl top 12, a front face of a lower part of a windshield 15, and front faces of lower parts of left and right front pillars 16, thus protecting the head of the pedestrian who has been bounced up onto the hood 11.

Figure 2:
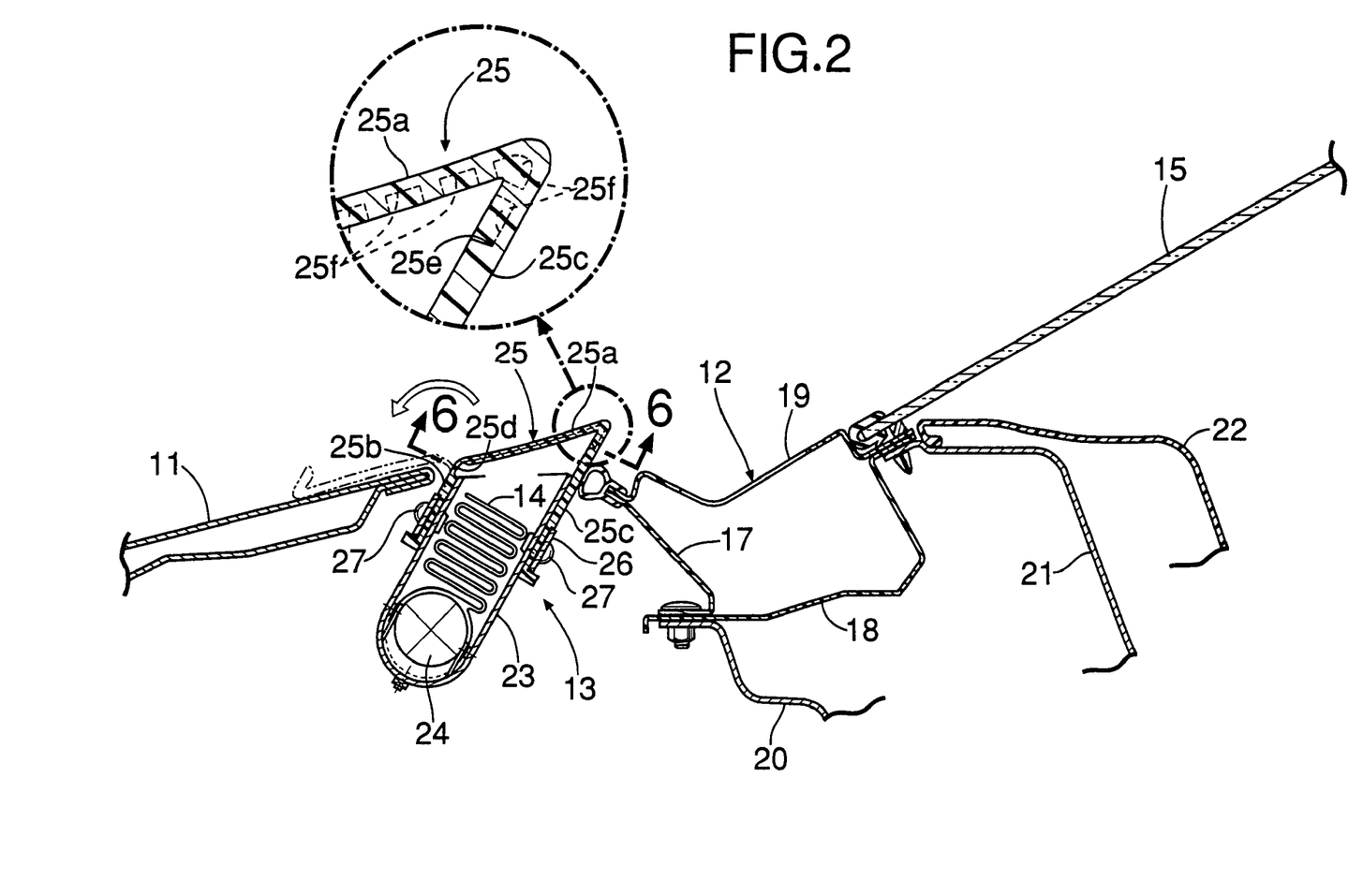
FIG. 2 is an enlarged sectional view along line 2-2 in FIG. 1.

As is clear from FIG. 2, the cowl top 12 is formed into a duct-like shape extending in the lateral direction of the vehicle body by comprising a cowl top outer part 17, a cowl top inner part 18 and a cowl top grill 19. The front end of a dash panel inner part 20 is connected to a portion joining together the cowl top outer part 17 and the cowl top inner part 18. The front end of a dash panel outer part 21 and the front end of the windshield 15 are connected to a portion joining together the cowl top inner part 18 and the cowl top grill 19. The upper face of the dash panel outer part 21 is covered by an instrument panel 22.

Figure 3:
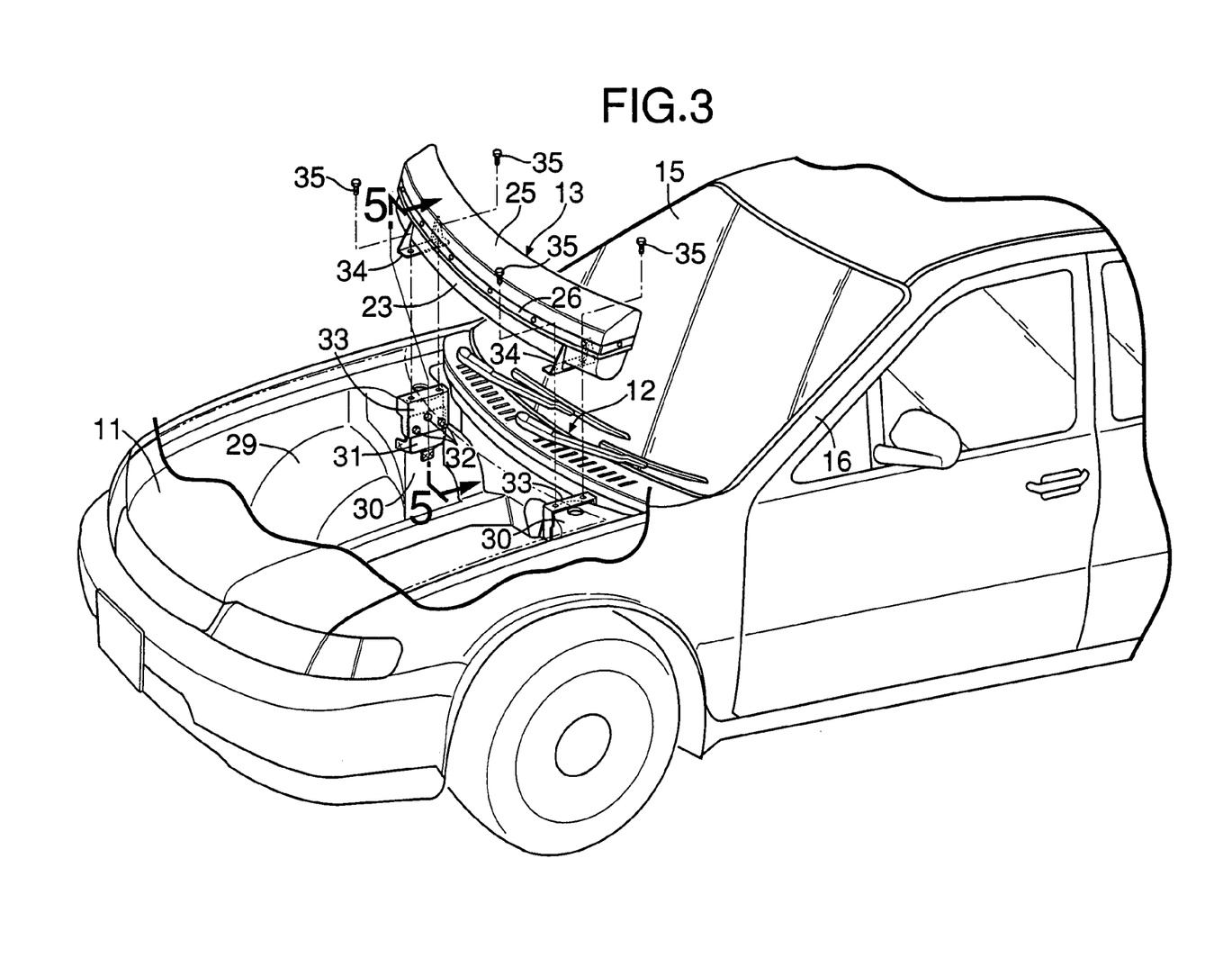
FIG. 3 is a view from arrow 3 in FIG. 1.
Figure 4:
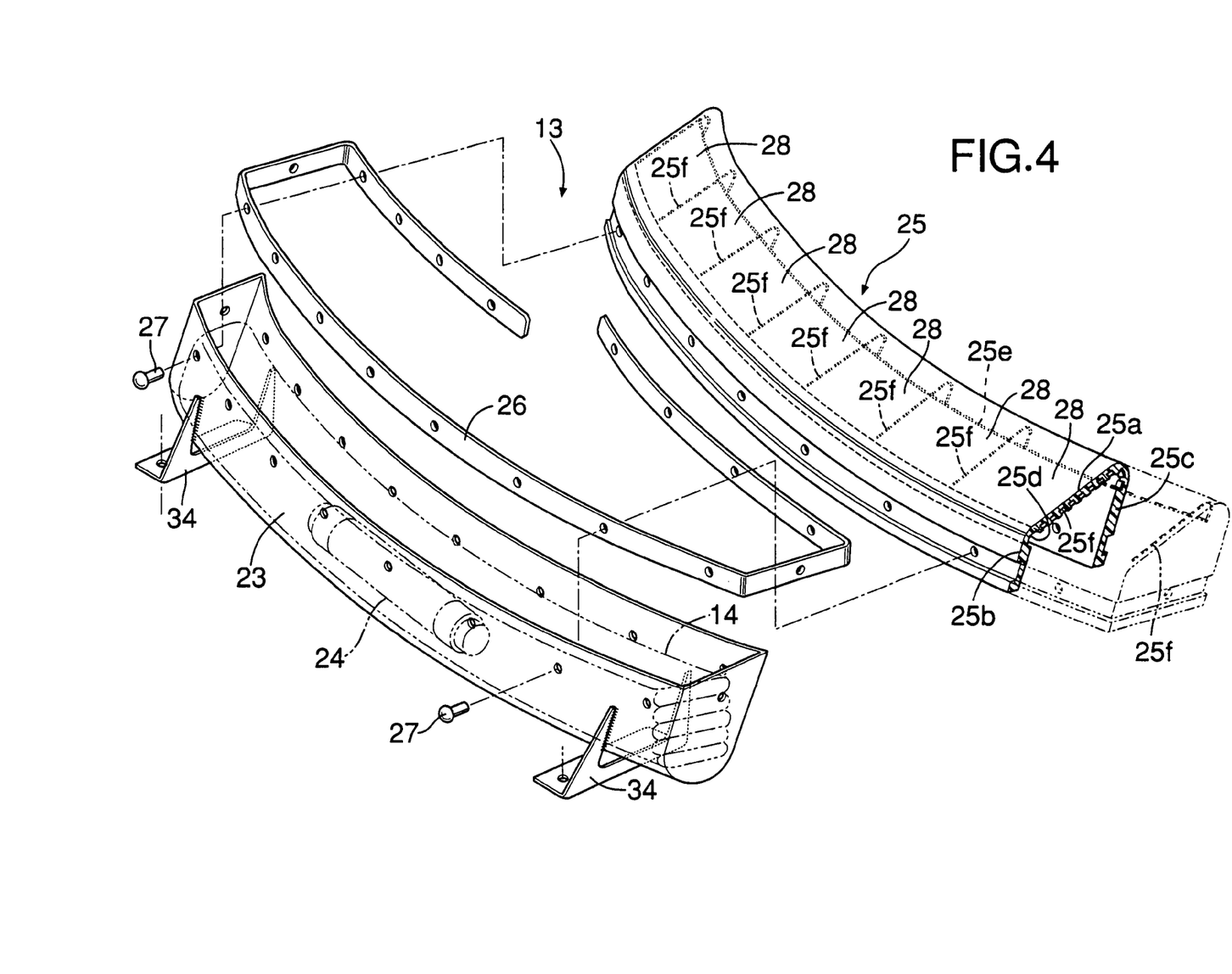
FIG. 4 is an exploded perspective view of an airbag module.

As is clear from FIG. 2 to FIG. 4, the airbag module 13 includes: a container-shaped retainer 23 having an open top face; an inflator 24 disposed in a central lower part of the retainer 23; an airbag 14 housed within the retainer 23 in a folded state; and a cover 25 made of a synthetic resin such as polypropylene covering the open top face of the retainer 23. The cover 25 has an open lower face whose edge is fitted to the periphery of the retainer 23, and secured to the retainer 23 by means of rivets 27 running through a metal band 26 wound around the cover 25.

The cover 25 includes an upper wall 25a, a front wall 25b and a rear wall 25c. The upper wall 25a is connected flush to the rear edge of the hood 11, and curved in an arc shape so that a central part in the lateral direction of the upper wall 25a projects toward the front of the vehicle body. A hinge part 25d is formed to be a thin-walled part extending along the border between the upper wall 25a and the front wall 25b of the cover 25 in the lateral direction of the vehicle body. A brittle portion 25e is formed by perforations extending in the lateral direction of the vehicle body in the vicinity of the upper end of the rear wall 25c, by laser processing the reverse face side of the cover 25. A plurality of brittle portions 25f are formed by perforations extending in the longitudinal direction of the vehicle body, by laser processing the reverse face of the upper wall 25a. The brittle portion 25e and brittle portions 25f are arranged in a comb shape, that is, forward ends of the brittle portions 25f are connected to the hinge part 25d, thereby dividing the upper wall 25a of the cover into a plurality of strip-shaped lids 28.

Figure 5:
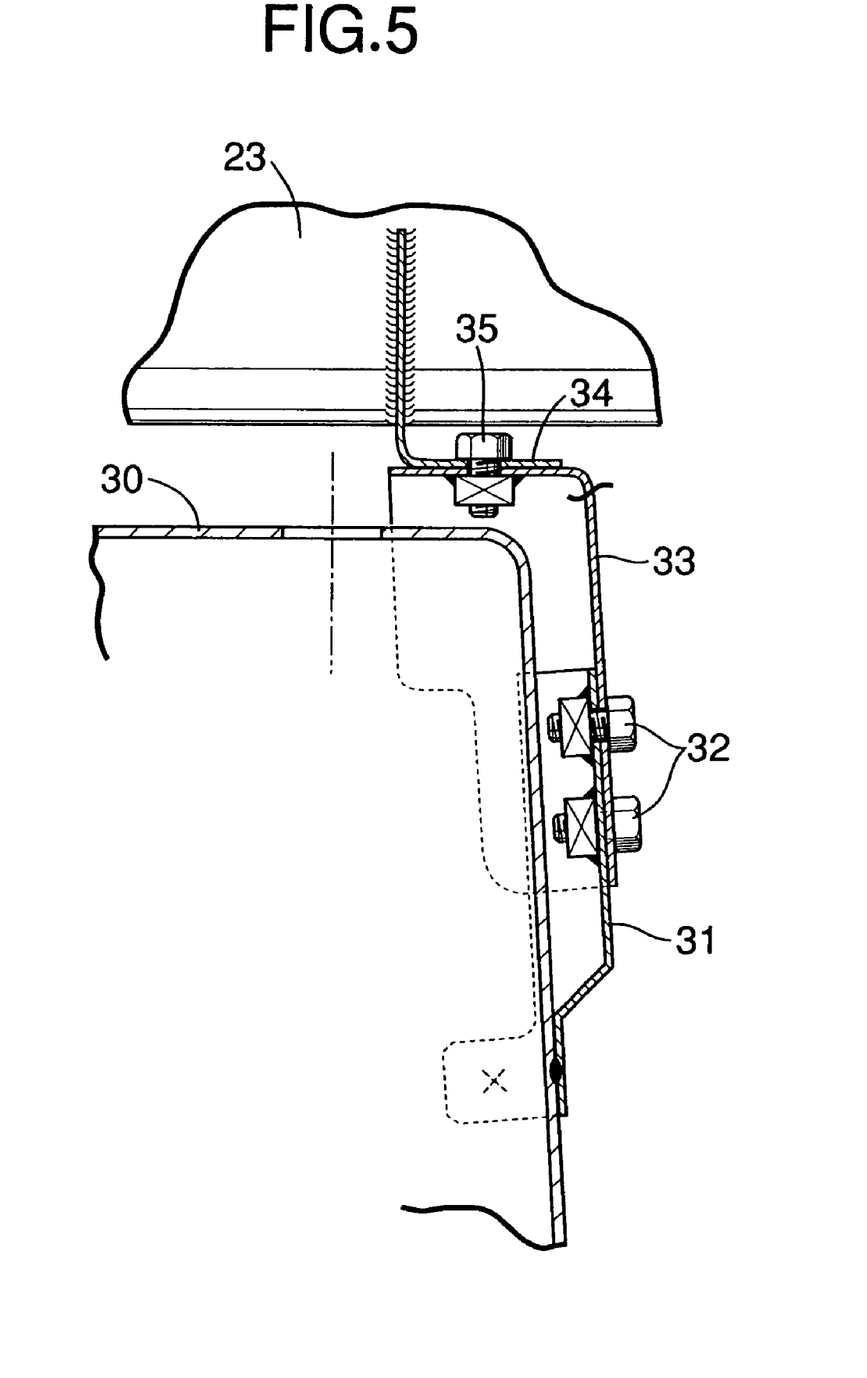
FIG. 5 is an enlarged sectional view along line 5-5 in FIG. 3.

As is clear from FIG. 3 and FIG. 5, a damper housing 30 housing a suspension damper (not illustrated) projects from a rear part of each of left and right front wheelhouses 29 provided within an engine compartment. A bracket 31 is welded to a side face of an upper part of each of the damper housings 30. A bracket 34 welded to the vicinity of an end part of the retainer 23 of the airbag module 13 is secured by bolts 35 to the upper end of a coupling member 33 which is secured by bolts 32 to the bracket 31.

The operation of the first embodiment of the present invention having the above-mentioned arrangement is now described.

Figure 7:
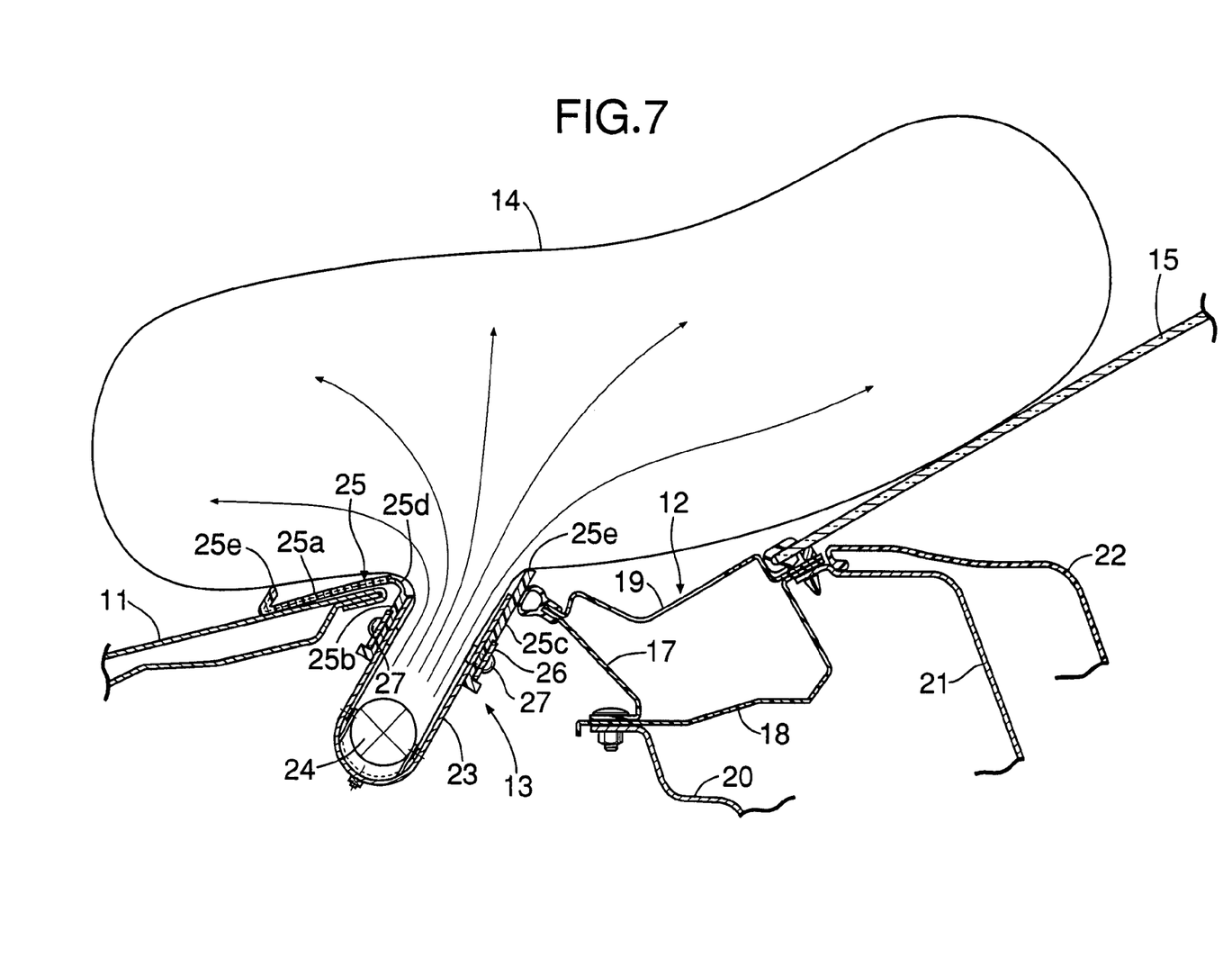
FIG. 7 is a diagram corresponding to FIG. 2, for explaining the operation when the airbag is deployed.

When the impact of a pedestrian being hit by the vehicle is detected, the inflator 24 generates gas to inflate the folded airbag 14, and the resultant pressure acts on the reverse face of the upper wall 25a of the cover 25. Since the comb-shaped brittle portions 25e and 25f are formed in the synthetic resin cover 25, the brittle portions 25e and 25f are ruptured by the pressure of the airbag 14, so that the plurality of lids 28 which are divided into strips open forward with the hinge part 25d at the front end serving as a fulcrum, thereby deploying the airbag 14 through the resultant opening. As shown in FIG. 1 and FIG. 7, the deployed airbag 14 covers the upper face of the cowl top 12, the front face of the windshield 15, and the front faces of the front pillars 16, thereby protecting the pedestrian who has been bounced up onto the hood 11.

Since the airbag module 13 is disposed along the front face of the cowl top 12 as described above without being housed within the cowl top 12, the airbag module 13 does not affect the intake of air into the vehicle compartment and the wiper positioning. Further, since the left and right ends of the airbag module 13 are supported by the upper parts of the left and right front wheel damper housings 30, the damper housings 30 obtain a high rigidity to reliably bear the reaction force during deployment of the airbag 14 without particularly enhancing the rigidity of the cowl top 12, the dash panel inner part 20, the dash panel outer part 21 and the other parts. Furthermore, the airbag module 13 having the above-described structure reinforces the vehicle body to enhance the rigidity.

Figure 6:
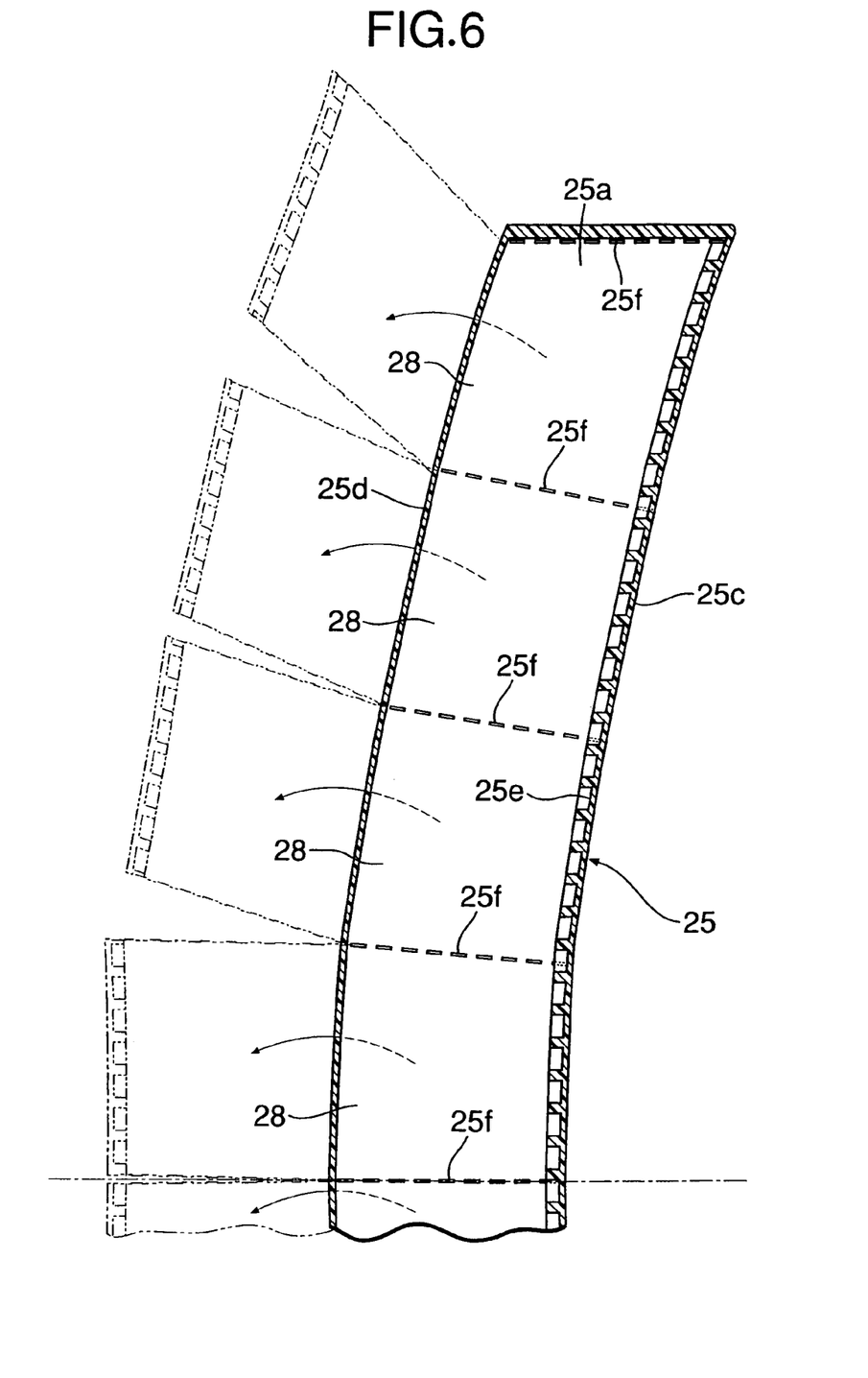
FIG. 6 is an enlarged sectional view along line 6-6 in FIG. 2.

In this embodiment, if the upper wall 25a was a single body, it could not pivot smoothly around the hinge part 25d, because the hinge part 25d at the front edge of the cover 25 is curved in the arc shape. However, since the upper wall 25a is divided into the strip-shaped lids 28 by the brittle portions 25e and 25f, the lids 28 can smoothly pivot as shown in FIG. 6. Further, since the brittle portions 25e and 25f are laser-processed to be perforations, they become inconspicuous to improve the appearance.

Figure 8:
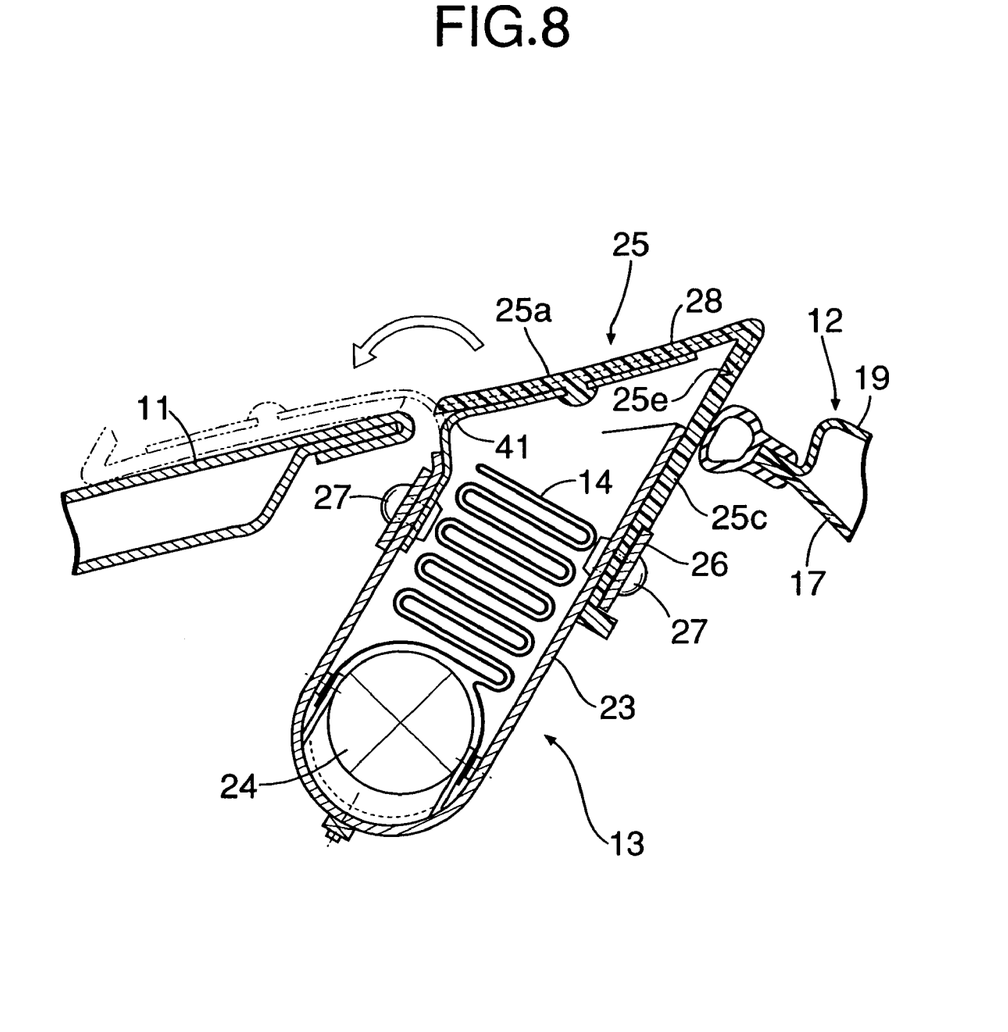
FIG. 8 is a diagram corresponding to FIG. 2, of a second embodiment.
Figure 9:
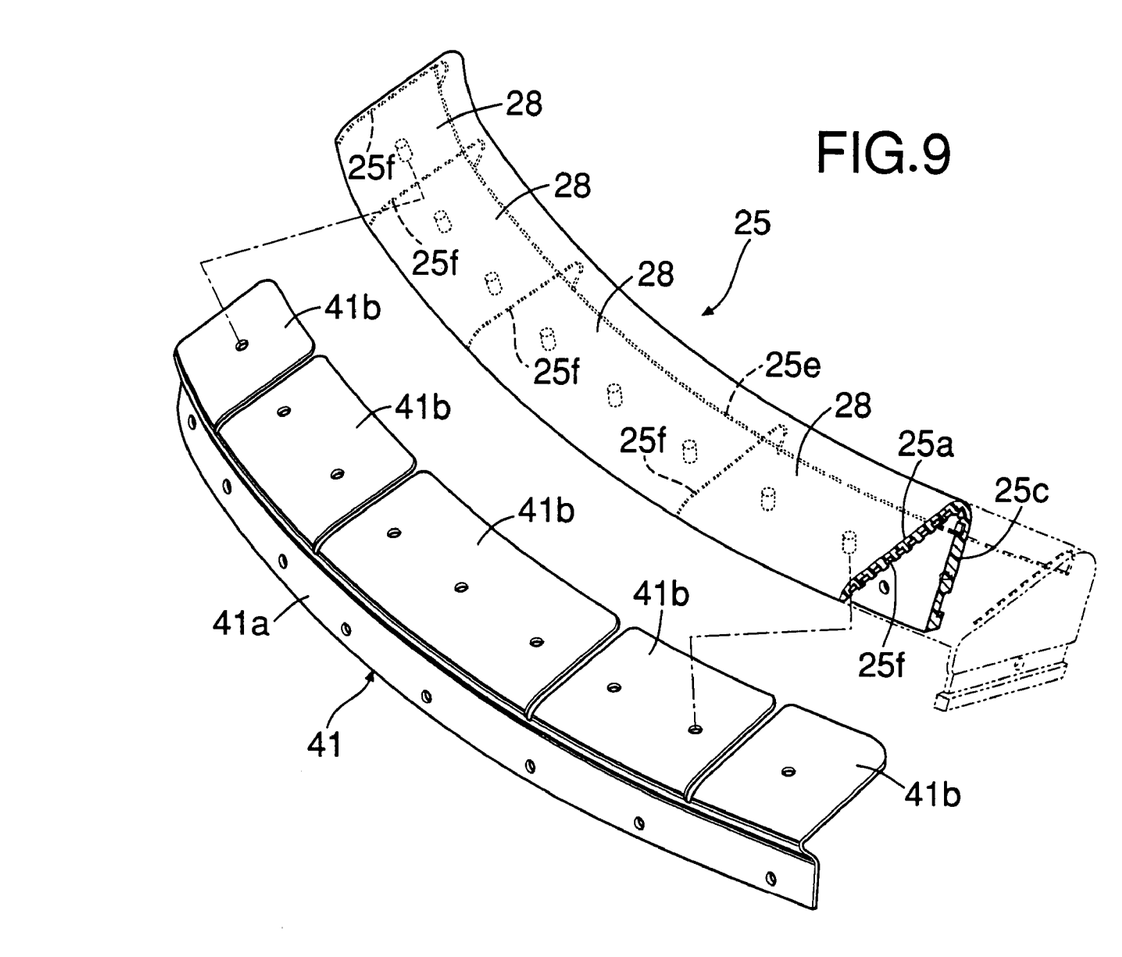
FIG. 9 is an exploded perspective view of a cover and a hinge member.

A second embodiment of the present invention is now described by reference to FIG. 8 and FIG. 9.

In the above-described first embodiment, the hinge part 25d is formed integrally with the synthetic resin cover 25, providing a possibility that the hinge part 25d might become brittle to split at low temperature. In the second embodiment, a cover 25 includes an iron hinge member 41 in place of a front wall 25b and a hinge part 25d. The hinge member 41 includes: a front wall 41a secured by rivets 27 to a retainer 23; and upper wall strips 41b which are formed by splitting an upper wall and secured by hot upsetting to lower faces of a plurality of lids 28.

In accordance with the second embodiment, since the iron hinge member 41 functions as a fulcrum when the upper wall 25a of the cover 25 opens while splitting into the plurality of lids 28, the hinge member 41 does not break to fly asunder even at low temperature. The other components and operational effects of the second embodiment are the same as those of the first embodiment.

Figure 10:
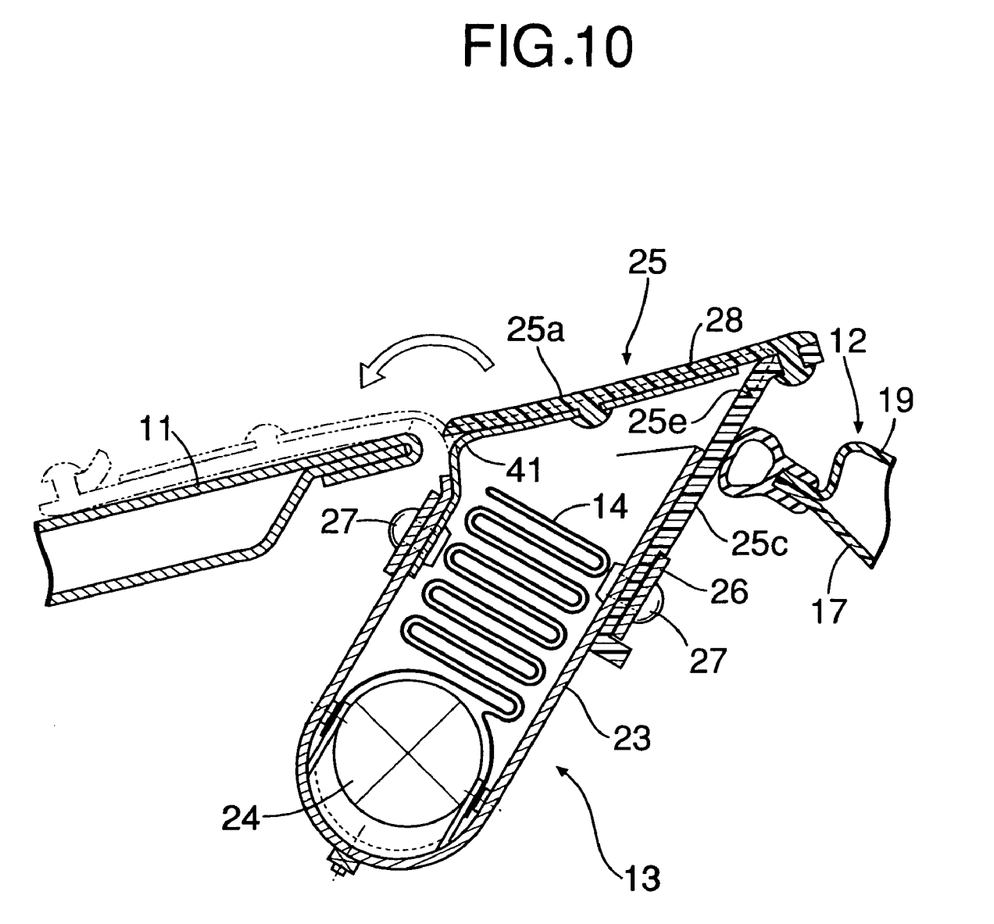
FIG. 10 is a diagram corresponding to FIG. 2, of a third embodiment.

A third embodiment of the present invention is now described by reference to FIG. 10.

In the cover 25 of the second embodiment, the upper wall 25a and the rear wall 25c are integral components; however, in a cover 25 of the third embodiment, a rear wall 25c is formed from a member that is separate from an upper wall 25a, and is secured to the upper wall 25a by hot upsetting.

In accordance with the third embodiment, forming the upper wall 25a and the rear wall 25c as separate members enables the cover 25 to be easily molded. The other components and operational effects of the third embodiment are the same as those of the second embodiment.

Figure 11:
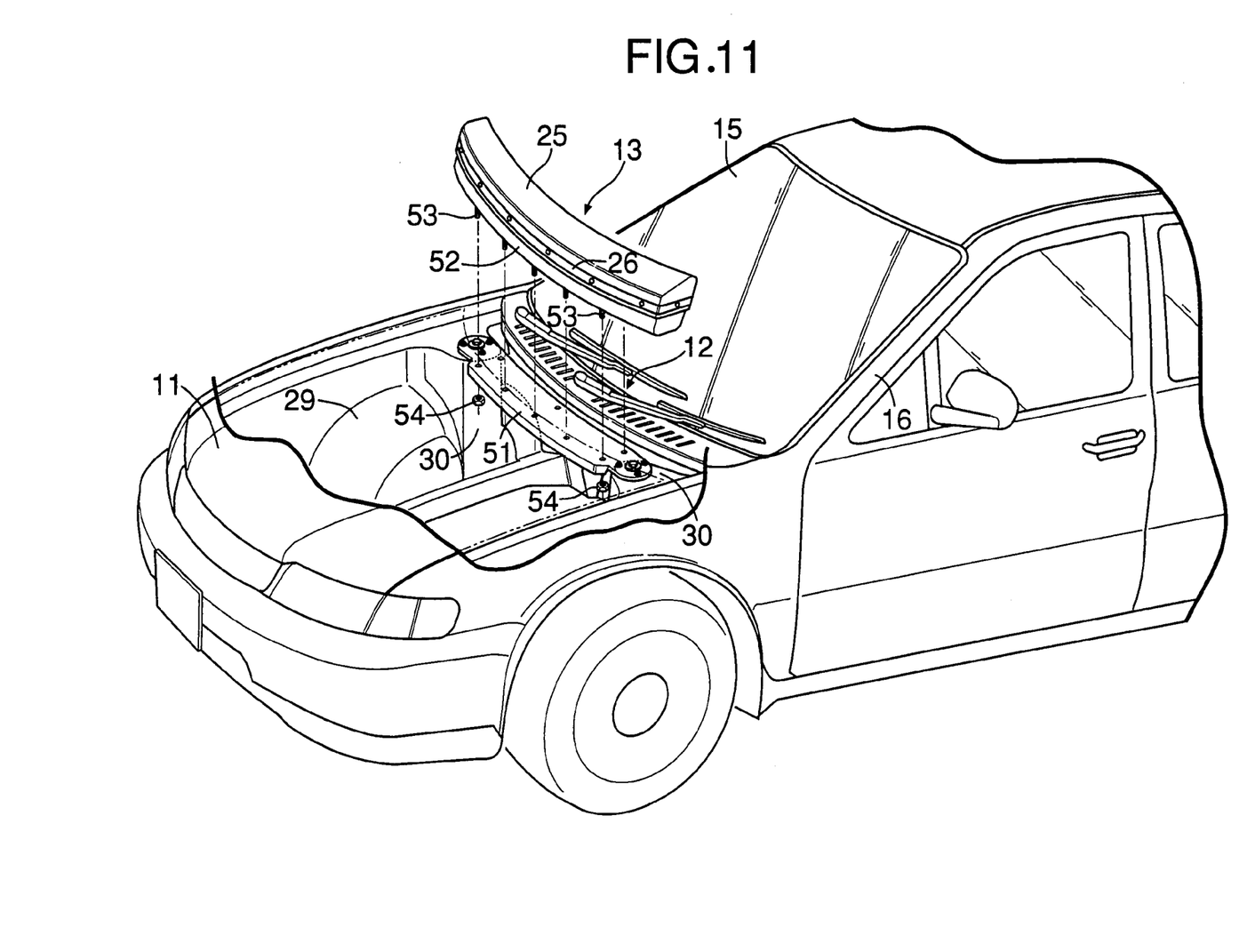
FIG. 11 is a diagram corresponding to FIG. 1, of a fourth embodiment.

A fourth embodiment of the present invention is now described by reference to FIG. 11.

In the fourth embodiment, upper ends of left and right damper housings 30 are connected by a strut tower bar 51 which is a metal reinforcing member, thus enhancing the rigidity of a vehicle body. Since the load generated by an airbag 14 being deployed can be supported by the strut tower bar 51, an airbag module 13 includes a synthetic resin casing 52 in place of the metal retainer 23, and this casing 52 is fixed to an upper face of the strut tower bar 51 by means of bolts 53 and nuts 54.

In accordance with the fourth embodiment, since the strut tower bar 51 which provides a connection between the upper ends of the left and right damper housings 30 functions as a retainer 23 for the airbag module 13, the retainer 23 can be eliminated while enhancing the rigidity of the vehicle body by the strut tower bar 51, thereby reducing the cost of the airbag module 13. The other components and operational effects of the fourth embodiment are the same as those of the first embodiment.

Although embodiments of the present invention have been described in detail above, the present invention is not limited to the above-mentioned embodiments and can be modified in a variety of ways without departing from the subject matter of the present invention.

What is claimed is:

1. A pedestrian protection airbag system for a vehicle having a cowl top that extends along a windshield, comprising:
    an airbag module disposed along a front face of the cowl top so as to extend in a lateral direction of the vehicle, said air bag module having left and right ends that are connected to, and supported on, upper parts of left and right damper housings of left and right front wheels,
    the airbag module comprising:
        an airbag; and
        an inflator that generates gas to deploy the airbag along an upper face of the cowl top and a front face of the windshield.

2. The pedestrian protection airbag system according to claim 1, wherein the upper parts of the left and right damper housings are connected to each other by a reinforcing member, said reinforcing member serving as a retainer for housing the inflator and the airbag of the airbag module.

3. The pedestrian protection airbag system according to claim 1, wherein the airbag module comprises a cover that opens when the airbag is deployed, and wherein the cover is divided into a plurality of lids arranged in the lateral direction of the vehicle, said lids being separated and defined by laser-processed breakable brittle portions.

4. A pedestrian protection airbag system for a vehicle, comprising an air bag module in combination with a cowl top, wherein the cowl top extends in a lateral direction of the vehicle, and is disposed between a windshield and the air bag module, said airbag module being disposed along a front face of the cowl top so as to extend in the lateral direction of the vehicle, said air bag module having left and right ends that are connected to, and supported on, upper parts of left and right damper housings of left and right front wheels, wherein the airbag module comprises:
    an airbag; and
    an inflator that generates gas to deploy the airbag along an upper face of the cowl top and a front face of the windshield.

5. The pedestrian protection airbag system according to claim 4, wherein the upper parts of the left and right damper housings are connected to each other by a reinforcing member, said reinforcing member serving as a retainer for housing the inflator and the airbag of the airbag module.

6. The pedestrian protection airbag system according to claim 4, wherein the airbag module comprises a cover that opens when the airbag is deployed, and wherein the cover is divided into a plurality of lids arranged in the lateral direction of the vehicle, said lids being separated and defined by laser-processed breakable brittle portions.

7. A pedestrian protection airbag system for a vehicle having a cowl top that is disposed between a windshield and a hood of the vehicle, comprising:
    an airbag module disposed along a front face of the cowl top so as to extend in a lateral direction of the vehicle, said air bag module having left and right ends that are supported on upper parts of left and right damper housings of left and right front wheels,
    the airbag module comprising:
        a retainer having a U-shaped cross section with an open top face;
        an airbag that is normally undeployed and disposed within the retainer;
        a cover that extends laterally to cover the open top face of the retainer, wherein an upper wall of the cover is normally generally flush with the hood in a longitudinal direction of the vehicle when the airbag is undeployed; and
        an inflator that generates gas to deploy the airbag along an upper face of the cowl top and a front face of the windshield.

8. The pedestrian protection airbag system according to claim 7, wherein the upper wall of the cover is connected flush to a rear edge of the hood and curved in an arc shape so that a central part in a lateral direction of the upper wall projects toward a front of the vehicle.

9. The pedestrian protection airbag system according to claim 7, wherein the upper parts of the left and right damper housings are connected to each other by a reinforcing member.

10. The pedestrian protection airbag system according to claim 7, wherein the cover is divided into a plurality of lids arranged in the lateral direction of the vehicle, said lids being separated and defined by laser-processed breakable brittle portions.

11. A pedestrian protection airbag system for a vehicle having a cowl top that extends along a windshield, comprising:
    an airbag module disposed along a front face of the cowl top so as to extend in a lateral direction of the vehicle and positioned between the cowl top and a rear edge of a hood, said air bag module having left and right ends that are connected to, and supported on, upper parts of left and right damper housings of left and right front wheels, wherein the upper parts of the left and right damper housings are connected to each other by a reinforcing member, said reinforcing member serving as a retainer for housing the inflator and the airbag of the airbag module,
    the airbag module comprising:
        an airbag;
        an inflator that generates gas to deploy the airbag along an upper face of the cowl top and a front face of the windshield; and
        a cover that opens when the airbag is deployed, and wherein the cover is divided into a plurality of lids arranged in the lateral direction of the vehicle, said lids being separated and defined by laser-processed breakable brittle portions.

* * * * *